US006996179B2

(12) United States Patent
Rovati et al.

(10) Patent No.: US 6,996,179 B2

(45) Date of Patent: Feb. 7, 2006

(54) COPROCESSOR CIRCUIT ARCHITECTURE, FOR INSTANCE FOR DIGITAL ENCODING APPLICATIONS

(75) Inventors: Fabrizio Rovati, Cinisello Balsamo (IT); Danilo Pau, Sesto San Giovanni (IT); Emiliano Piccinelli, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 885 days.

(21) Appl. No.: 09/819,940

(22) Filed: Mar. 27, 2001

(65) Prior Publication Data

US 2002/0031179 A1 Mar. 14, 2002

(30) Foreign Application Priority Data

Mar. 28, 2000 (EP) .......................................... 00106589

(51) Int. Cl.
*H04N 7/12* (2006.01)

(52) U.S. Cl. ................................................ 375/240.16

(58) Field of Classification Search ............ 375/240.16, 375/240.12, 240.02, 240.18; 348/394.1, 402.1, 348/407.1, 416.1; H04N 7/12
See application file for complete search history.

(56) References Cited

U.S. PATENT DOCUMENTS 5,487,024 A * 1/1996 Girardeau, Jr. ............. 708/606
5,583,580 A 12/1996 Jung
5,630,033 A * 5/1997 Purcell et al. .............. 345/418
5,717,441 A 2/1998 Serizawa et al.
5,910,824 A * 6/1999 Yu ............................ 348/714
6,360,014 B1 * 3/2002 Boon ......................... 382/233
6,456,659 B1 * 9/2002 Zuccaro et al. ........ 375/240.16
6,504,872 B1 * 1/2003 Fimoff et al. .......... 375/240.27
6,518,974 B2 * 2/2003 Taylor et al. ............... 345/582

FOREIGN PATENT DOCUMENTS

EP 0778698 A2 6/1997
EP 0778698 A3 7/1997
EP 0944245 A1 9/1999

* cited by examiner

*Primary Examiner*—Nhon Diep
(74) *Attorney, Agent, or Firm*—Lisa K. Jorgenson; E. Russell Tarleton; Seed IP Law Group PLLC

(57) ABSTRACT

A coprocessor circuit for processing image data in digital form, having a motion vector controller block for generating, starting from the image data, motion vector values that include predictor data and macroblock data relating to a current macroblock of the image data to be estimated and being adapted to be stored at respective memory addresses. Also included is an address generator block for extracting respective addresses from the motion vector values, a predictor fetch block for retrieving predictor data based on respective addresses extracted by the address generator block, a current macroblock fetch and distengine block for retrieving macroblock data based on respective addresses extracted by the address generator block and for processing the macroblock data according to a given function, and a decision block for collecting the retrieved data as partial results and selecting the best result therefrom.

47 Claims, 15 Drawing Sheets

COPROCESSOR CIRCUIT ARCHITECTURE, FOR INSTANCE FOR DIGITAL ENCODING APPLICATIONS

TECHNICAL FIELD

The present invention relates to circuit architectures, and was developed with a view to the possible use for digital encoding applications.

BACKGROUND OF THE INVENTION

Several digital video encoding standards have been developed during the past years, but the most important for the present and foreseeable future are:

- MPEG-2 for television-like resolutions and high bitrates (greater than 1.5 Mbits/s) for digital video cameras, DVD recordable applications
- MPEG-4 or H263 for video telephony (especially for wireless mobile terminals) for lower resolutions (e.g., QCIF—176 by 144 pixels) and lower bit rates (less then 1 Mbits/s)

While the following explanation will be provided by primarily referring to MPEG-2, the same points apply in principle to the other standards listed as it can be gathered, e.g., from the ISO/IEC 13 818-2 MPEG-2 and ISO/IEC 14 469-2 MPEG-4 video coding standards.

The encoding process is based on several tasks in cascade, of which motion estimation is by far the most expensive computationally. The standard defines the output of the estimation block (a motion vector and the prediction error), but leaves freedom on how this estimation is done, so that encoder providers can use a preferred estimation technique and implementation to add value to their box (lower cost, higher picture quality). After motion estimation a set of decisions have to be taken on how one wants to encode each MB (MacroBlock, the "quantum" or basic building block in which is decomposed every picture for motion estimation). Also one must provide the predictor itself (i.e., the macroblock that the estimation process has found to be best matching to the one currently under process) to the rest of the encoder chain.

All these operations require so much computational power that it is impractical to implement them even on very high performance CPUs/DSPs without heavily compromising on overall picture quality of the encoded bitstream. On the other hand, to be able to support different standards and to be able to tweak the motion estimation algorithm, means are required adapted to be programmed or even re-programmed on the field, for example by downloading off-the-air the new version of the algorithm on the terminal. The motion estimation algorithm is not fixed by the standards and it is crucial to give a performance competitive advantage to the overall encoder. So a better version of the motion estimation algorithm can result in increased perceived performance of the overall encoder.

Another key aspect of the motion estimation task is its memory bandwidth requirement. As an extensive search for the best match must be performed within very large search windows, all the algorithms tend to eat up a large amount of system memory bandwidth. Typical bandwidth (B/W) figures for this task are in excess of 100 MB/s. This has two main drawbacks: expensive high-speed and/or wide-wordlength memory devices are required and power consumption is increased, as higher external I/O activity means more power wasted on the device's heavily (capacitive) loaded external pins.

These reasons lead to the need for a motion estimator algorithm that has a low cost (low computational complexity) yet a high performance in terms of picture subjective quality and for a motion estimation engine that is equally cost effective (low area), flexible (SW programmable), low bandwidth and low power, as most of the applications target battery-powered mobile terminals (cameras, cellular phones).

Examples of prior attempts by others are described in the following documents, e.g., EP-A-0 895 423, EP-A-0 895 426, EP-A-0 893 924, EP-A-0 831 642, U.S. Pat. No. 5,936,672 and U.S. Pat. No. 5,987,178.

Once the key characteristics of a motion estimator engine are identified, architectural solutions that can achieve those goals must be found. The required features are low-cost (i.e., low area), low bandwidth, low power, high flexibility.

SUMMARY OF THE INVENTION

In one preferred embodiment, the invention provides a SLIMPEG Hardware Engine (SHE) motion estimator coprocessor for digital video encoding applications. The approach that has been followed for its architecture is to provide as much flexibility as possible in terms of algorithms and encoding standards supported, whilst keeping a very cost-effective and power-friendly implementation. The same area size and power consumption characteristics of an hardwired implementation are provided, yet keeping all the flexibility of a software implementation.

The engine is composed by a novel low-cost small-area pipeline, a cache-based internal storage for the search window pixels yielding B/W and memory size savings versus a conventional approach, and a DSP micro controller to achieve software flexibility. This architecture is helpful for low-cost and low-power implementations such as digital video cameras or 3G wireless terminals incorporating video transmission capabilities.

Being a micro coded engine, the solution of the invention can run different motion estimation algorithms (provided they do not require more then the SHE intrinsic computational power), although SHE has been specifically designed to support the SLIMPEG recursive motion estimation algorithm, in all its versions and variants as described in various publications, for example, see European Patent applications 97 830 605.8, 98 830 163.6, 97 830 591.0, 98 830 689.0, 98 830 600.7 and 98 830 484.6.

The solution of the invention is adapted to support different digital video encoding standards, including MPEG-2, MPEG-4 and H263.

In a traditional approach during motion estimation, the algorithm searches for the best match inside a predefined search window. To decrease memory bandwidth, usually the engine has a built-in local memory to buffer the entire search window. This leads to a substantial amount of memory required, in the range of 40 KBytes for typical PAL frames search windows (+/−120 horizontally, +/−72 vertically). As the motion estimator moves on subsequent macroblocks, it must update the local search window to follow the current macroblock. This update takes anyway a substantial amount of bandwidth, typically in excess of 100 MB/s.

In a preferred embodiment of the invention a different architectural approach is used to search window buffering: the internal memory is managed as a CPU cache, loading the search window pixels only when they are really needed and buffering them in the dynamically allocated internal memory. Due to its statistical averaging nature, caches are not generally deemed safe for real-time operation. For this reason, a bus access limiter (briefly called a "bandwidth cap") has been coupled to the cache refill engine. This device will monitor and influence bus accesses, effectively clipping the sporadic high-bandwidth peaks that could occur in particularly stressing macroblocks, to assure that the real-time B/W budget is never exceeded. This is enforced on a macroblock by macroblock level, thus ensuring very fine grained control on B/W. The maximum allowed B/W value can be dynamically changed, based on system configuration or working conditions (e.g., battery level: lower B/W means lower power consumption).

To perform motion estimation, means are required to gauge if a predictor is better than another; a usual cost function for that is to take each respective pixels, make the absolute difference and accumulate it for the all macroblock. This pixel comparison is called Sum of Absolute Differences (SAD). The overall macroblock figure is instead called Mean Absolute Error (MAE). A hardware block is thus required to perform SAD operations efficiently.

Conventional implementations of this function are via systolic arrays engine, arrays of 16 by 16 (=256) SAD processing elements, computing each clock cycle one MAE figures. These blocks are characterized by very fast computation speed, but also by relatively high complexity, as they use a lot of processing elements (PE) and they must gather and move all the data and partial results to keep the engine going.

SLIMPEG features can once again be exploited to decrease complexity. This means that one only needs a mono dimensional array of 16 SAD elements. This can be called a "distengine", as the MAE is also known in technical literature as "level 1 distance". A solution can thus be selected that is 16 times less complex in principle (16×1 vs. 16×16 SAD element).

The flexibility needed is therefore on motion vectors selection, search windows parameters, matching modes, coefficients, thresholds, matching block size, and so on. This can be achieved by a pipeline control that is not based on hardwired Finite State Machines but on a micro code running on a dedicated controller/DSP.

All the algorithm characteristic then are not frozen in the silicon but residing in a flash memory then can be easily reprogrammed, allowing maximum flexibility.

In the presently preferred embodiment, developed with respect to MPEG-2, the solution of the invention will support:

- Frame pictures organization
- Fully programmable motion estimation algorithm
- Frame and field prediction modes (four field modes: Top/Bottom ON Top/Bottom)
- Programmable GOP M=1, 2, 3, any N value (but must be a multiple of M by MPEG-2 standard)
- B picture support for M>1 (backward, forward, interpolated mode)
- Dual prime prediction for M=1
- Half pixel accuracy during the whole estimation process
- Prediction based on 16 by 16 pixels macroblocks
- Unlimited telescopic search windows (up to maximum size allowed by MPEG2 MP@ML 1023.5 by 127.5)
- Luma prediction error for winning predictor dma-ed to external buffer/memory. Alternatively (programmable), predictor and current macroblock can be output.
- Intra/not intra coding decision
- MC/not MC coding decision
- DCT type (frame or field mode) coding decision
- Activity index computation
- Scene change detection
- Inverse 3/2 pull down detection
- Interlaced or progressive picture content detection
- Concealment motion vectors for I pictures
- Automatic f_code decision at frame level.
- Programmable bandwidth cap (bus accesses limiter)
- DMA gathering and delivery to external buffer of chroma prediction error (Optional)
- Motion compensated noise level estimation and reduction on luma component (Optional)

In the foregoing "Optional" means that hardware means could be built-in to support the feature. If the feature is not needed, the relevant hardware will not be present in the device.

In the presently preferred embodiment the solution of the invention will take as input the source original or reconstructed images. In particular, SLIMPEG coarse search will always be performed on the original prediction pictures, whilst fine search will always be performed on the reconstructed anchor frames. Of course, during motion estimation only the luma component of the images will be used.

Images will always be stored as frames, even if they come from interlaced sources. Pixels will be 8-bit unsigned integer quantities. Prediction error pixels will be 16-bit signed integer quantities.

Images in memory are always assumed to be in macroblock (or block) tiled format. That is, all the pixels of a (macro)block will reside in consecutive addresses of memory, to optimize cache refill accesses. Inside each (macro)block, scan order will be from top to bottom and from left to right (lexicographical order).

The source images can be independently pre-processed for format conversion and/or noise reduction. Alternatively, motion compensated temporal noise reduction means (for luma) can be added to the SHE. The results of motion estimation, prediction error computation and decision process will be:

- Motion vectors: these will be in X and Y relative position, half pixel accuracy (i.e., a value of 1 means a 0.5 pixels displacement). Signed 16-bit values will be used for each field. These motion vectors will be then re-used for recursive estimations according to the SLIMPEG algorithm. Both coarse and fine search vectors will be available in external memory, although only fine search vectors will be used for bitstream creation. Coarse search vectors can be used for ancillary algorithms.
- Luma prediction error (alternatively, luma predictor and current macroblock): these will be DMA-ed in an intermediate buffer, to be read by the loop encoder. In case prediction error is required, it will be in signed 16-bit values, requiring a total storage area of 512 bytes per luma macroblock. In case separate current and prediction MBs need to be output, the same 512 bytes area will be used as unsigned 8-bit values to hold the current MB in the first half and predictor in the second half of the buffer.
- Optionally, the same output can be provided for the chroma components of the frame. In this case, one 256 bytes area is required (4:2:0 format). U and V components will be stored sequentially.
- Decisions results, in the form of a set of flags and activity coefficient.

The arrangement of the invention lends itself ideally to be incorporated in the form of an integrated circuit (IC), preferably of the monolithic (single-chip) type.

BRIEF DESCRIPTION OF THE DRAWINGS

A preferred embodiment of the invention will now be described, by way of non-limiting example only, with reference to the enclosed figures of drawing, wherein.

DETAILED DESCRIPTION OF THE INVENTION

Figure 1:
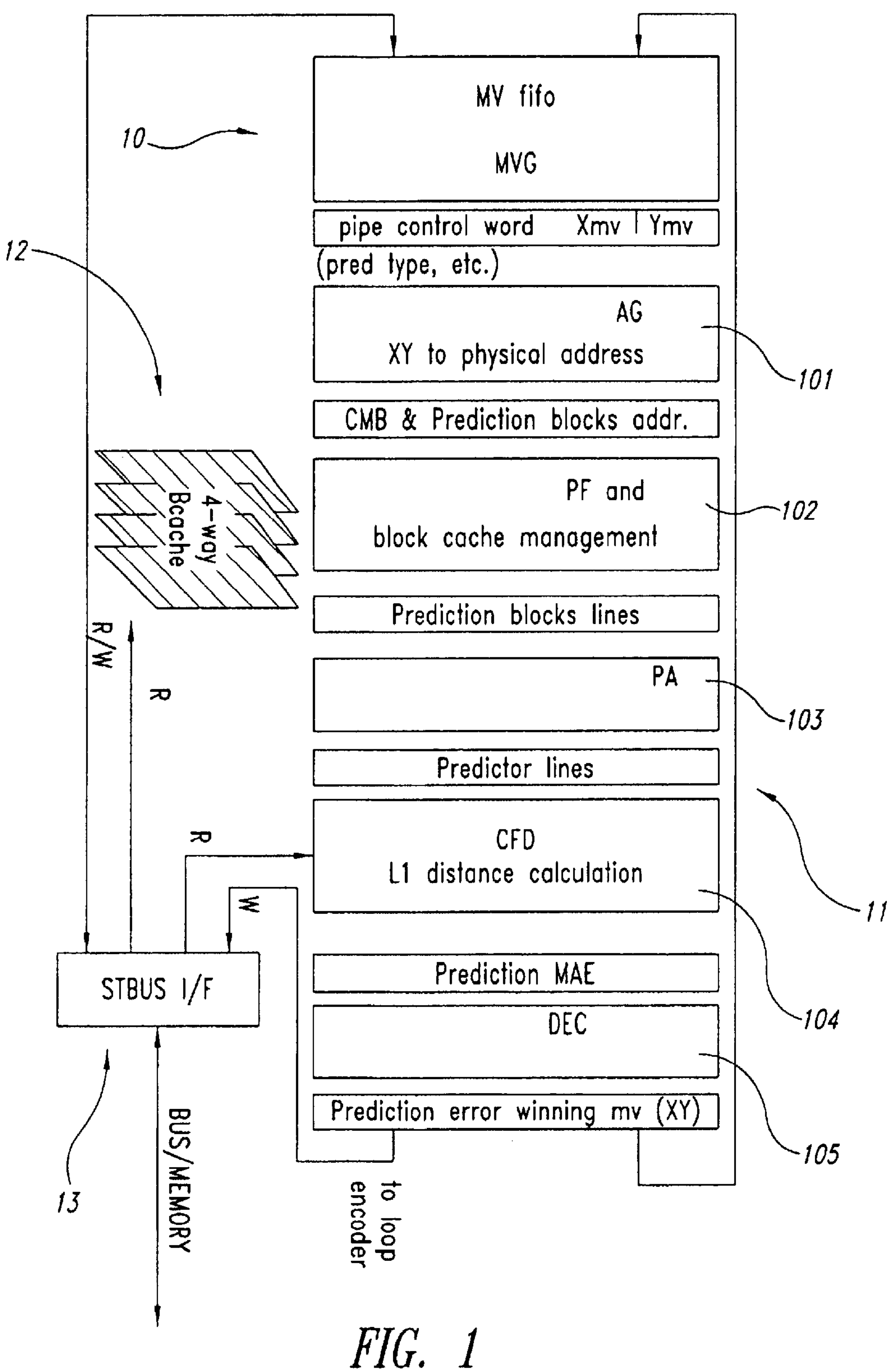
FIG. 1 represents the overall architecture of a hardware engine according to the invention.

In the drawing annexed, FIG. 1 shows a presently preferred embodiment of the SLIMPEG Hardware Engine (SHE) circuit architecture of the invention.

The engine includes a Motion Vectors (MV) generation controller 10, a matching error computing pipeline 11 (pipeline flow is from left to right in the drawing), a local cached memory 12 and by BUS interface 13. Each stage is not a straight combinatorial one as in GPCPUs, but is actually a multi-cycle elaboration block. This means that each stage might have multi-cycle inputs (i.e., will require inputs for two or more consecutive cycles), multi-cycle elaboration (i.e., the input→output delay will be more than one cycle) and multi-cycle output (i.e., the output will last for more than one cycle). This is explained in more detail in the following in connection with FIG. 15.

Figure 3:
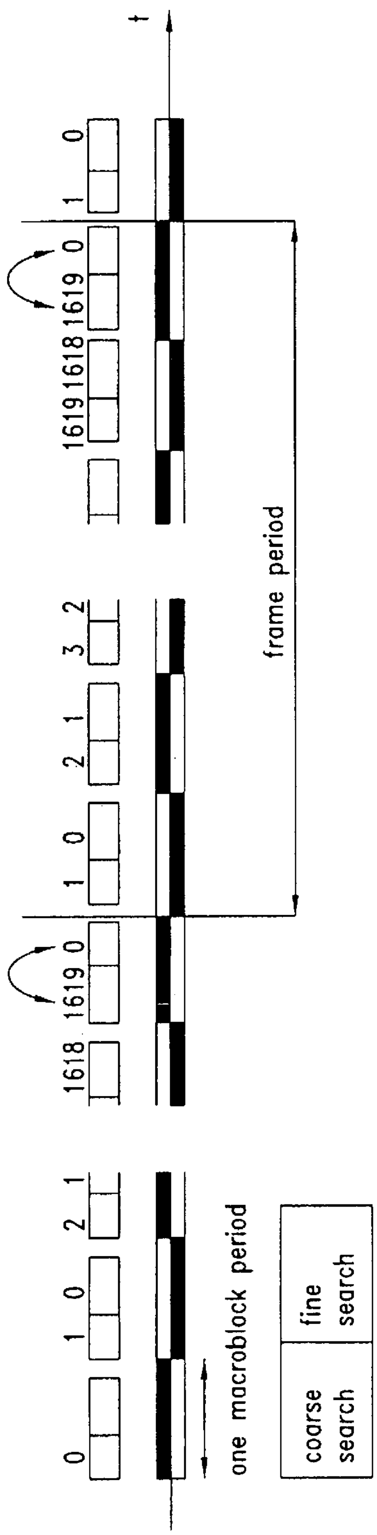
Figure 4:
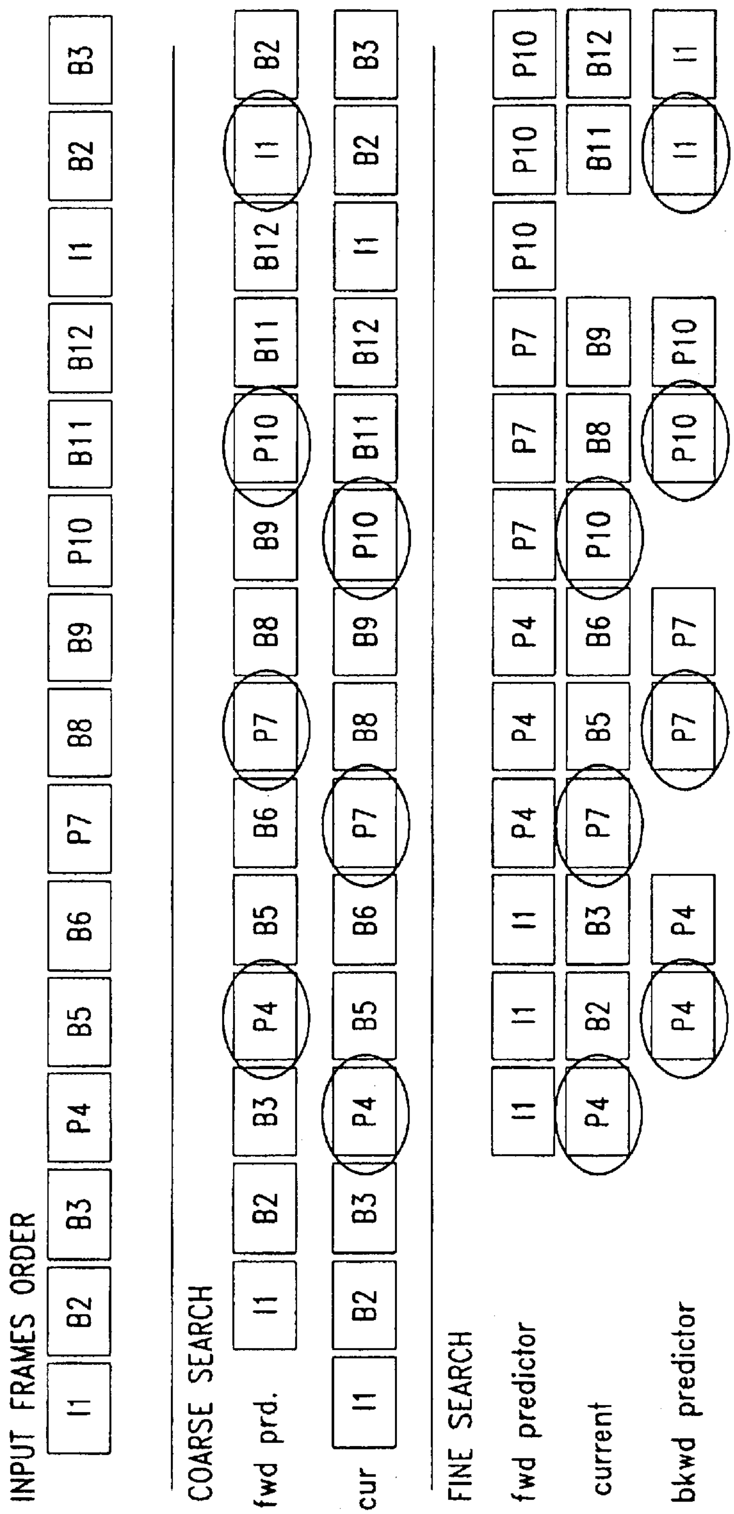
FIG. 4 shows coarse/fine prediction frames overlap.

SLIMPEG is based on two distinct estimation steps for each picture, the coarse search and the fine search. For real-time implementation constraints, these will operate in parallel on different macroblocks, time-sharing the HW resources of the SHE. Each macroblock period SHE will generate the result of the coarse search for a macroblock, and the results of the fine search for another one. This overlapping is shown in FIGS. 2, 3 and 4.

Figure 2:
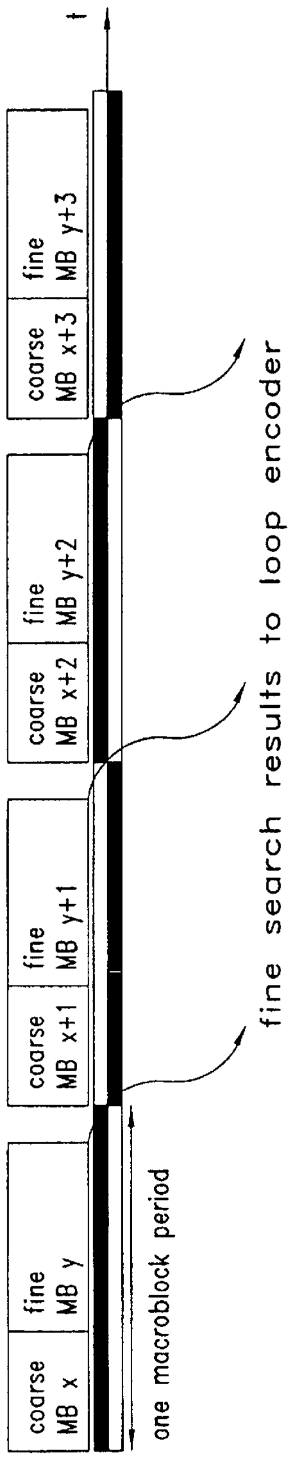
FIG. 2 and FIG. 3 show coarse and fine search overlap in the circuit of the invention.

Specifically, FIG. 2 shows that both coarse and fine search functions use the same hardware resources in time division.

Inside the engine, operation is directed by the MV Generator controller (MVG), which is in charge of selecting the motion vector to test according to the SLIMPEG algorithm and keeping track of the time used for each macroblock to correctly synchronize its input/output operations. With its spare processing power, it runs ancillary algorithms like scene change detection, inverse 3/2 pulldown and so on. The MVG will then generate MV coordinates and control words to instruct the pipeline on how to exactly use the motion vectors.

The address generator (AG) 101 will then translate the motion vector's XY displacements into blocks physical addresses in memory, to be used by the predictors fetch (PF) 102 stage. The prediction pixels extracted are then aligned and (if appropriate) interpolated by the Predictor Alignment (PA) 103, and then fed to the Current MB Fetch and Distengine (CFD) 104 to fetch the current macroblock under prediction and compute the mean absolute error (MAE) of the prediction. The decision block 105 will gather all the MAEs and decide which is the best prediction. After that, the intra/not intra, mc/not mc, DCT type coding decisions, activity index are computed on the winner predictor, then DMAed to the loop encoder together with the prediction error. Computed motion vectors winners will be fed back to the MVC as needed by the SLIMPEG algorithm.

Optionally, the SHE could also support DMA fetch and prediction error composition for the chroma part of the image. In that case, a dedicated block inside SHE attached to the decision stage will take care of that.

Also optionally, temporal noise reduction means could be attached at the output of the decisions block to noise-reduce the source images. This block will perform motion compensated noise level detection and reduction based on the motion vectors resulting from the coarse search. The coarse search current macroblock and its predictor will form the input of this block, which will output a noise-reduced version of the current macroblock that will overwrite the noise corrupted one.

Figure 5:
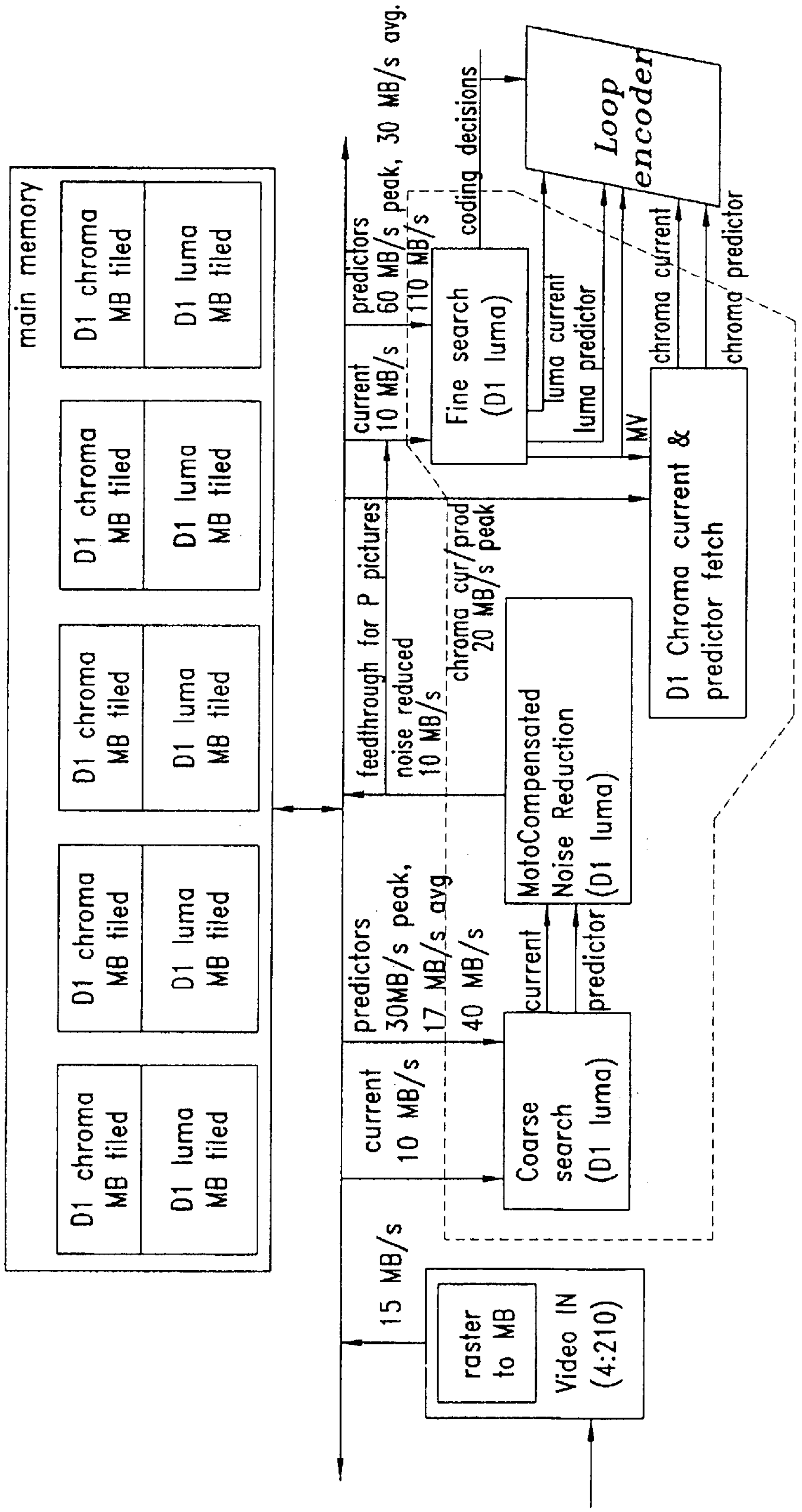
FIG. 5 shows a typical MPEG-2 front end processing flow, FIG. 6, including three portions designated a), b) and c), shows exemplary motion vector (MV) management in the circuit of the invention.

In FIG. 5 there is shown a functional diagram for a typical MPEG-2 front end part when using SLIMPEG and SHE to implement it.

Input frames will be stored in main memory from the video input device. For the sake of simplicity these images are assumed to be already of the correct format and scan needed for processing (e.g., D1 4:2:0 format and MB tiled scansion in memory). An incoming image will be first read by the coarse search process to be the object of estimation. As this proceeds, prediction blocks will be fetched as the B cache generates misses. For each of the current image macroblocks, a coarse motion vector and prediction error will be computed. The MV will be stored in the MV field in main memory (not shown in picture) to form the bases for the fine search on the same image and for the coarse search of the next image. The MV (if needed), the current and the prediction MB will also be output to the MCNR block, which will cancel (most of) the noise carried in the current MB, enhancing picture quality and compression efficiency. This filtered macroblock will overwrite the original one, and therefore a noise reduced version of the source image will form in memory. This noise reduced version will be used as the current frame for fine search estimation. The prediction frames used will be the noise reduced anchor frames, coded and reconstructed.

Meanwhile, fine search will run concurrently. For B pictures, this will be running on different pictures (i.e., while coarse search estimates picture N, fine search will estimate picture N-3 in temporal source order). Therefore those will be two completely independent processes. During P estimation anyway, coarse and fine search will operate on the same picture, with just a few macroblocks delay. It is therefore necessary to take care that the noise-reduced version of the source picture will be used as the current MB. This is done forwarding the result of the MCNR to the fine search process. In actual hardware, this results in just a macroblock buffer, as coarse search, MCNR and fine search will run on the same SHE engine. Moreover, this will save 20 MB/s, as the write and reload operations are in this case redundant. As usual, fine search will fetch the prediction blocks needed from the anchor frames, and will produce a best predictor, along with all the decisions taken for that macroblock. These will be given to the loop encoder, to continue the processing chain.

The MVG 10 is the controlling block of the coprocessor, being responsible to generate the test motion vectors with the appropriate control words. It will also be responsible for the overall timing of the engine, in order to synchronize SHE inputs and outputs with the appropriate time slots. Beside these main features, we will use its spare processing power is used to compute the "encoding enhancing" ancillary algorithms such as scene cut detection, inverse 3/2 pulldown, interlace/progressive content detection, f_code adaptation. All these algorithms are based on indexes computed starting from SLIMPEG coarse prediction motion vectors field, thus with low complexity.

The MVG has a built-in counter that will allow it to take count of the cycles spent to estimate the current macroblock. Normally, each macroblock estimation will take less than 24.7 μs (the macroblock source period) to complete, so SHE could run ahead of the video input device. This can be avoided by this control, that will keep SHE in synch with input, inserting stall or power down cycles (or, alternatively, additional motion vectors tests) to wait for the input. In the same manner, in some worst cases, memory bus traffic could cause SHE to stall for too many cycles, causing it to exceed the macroblock period. When this happens, this could lead to missing rendezvous with the loop encoder. In this case, similarly, the timer function could cause the estimation to finish in order to give the result to the loop encoder.

All these functions are preferably microcoded to allow upgrade and feature changes. Therefore, the MVC is a microcontroller or DSP device rather than an hardwired FSM. To achieve maximum optimization, it is possible to design a custom microcontroller, with a custom ISA and implementation. The choice of which DSP to use is done on its ability to support the required tasks and on its availability. The D950 DSP manufactured by STMicroelectronics is a preferred choice for that purpose.

Because of the recursive nature of SLIMPEG, a buffering circuit is needed in order to be able to re-use the generated motion vectors. Buffers are required in the main memory as well as on board of the MVG. The latters will be simple FIFOs or circular buffers, that can be implemented in the X or Y memory of the D950 DSP.

As for the size and quantity, several "slices" of vectors in the D950 local memory and MV fields in main memory are required. A slice is an horizontal line of 45 MB; a slice of vectors is therefore composed by the 45 MVs associated with those macroblocks; but 46 or 47 MVs FIFO are actually used as described later. Each slice will then require 184 or 188 bytes, as each MV will use a 32-bit word. Each "MV field" will be the collection of the 1620 (PAL) or 1350 (NTSC) MV associated to each macroblock of a picture. This means 6480 (PAL) or 5400 (NTSC) bytes for each MV field.

Figure 6B:
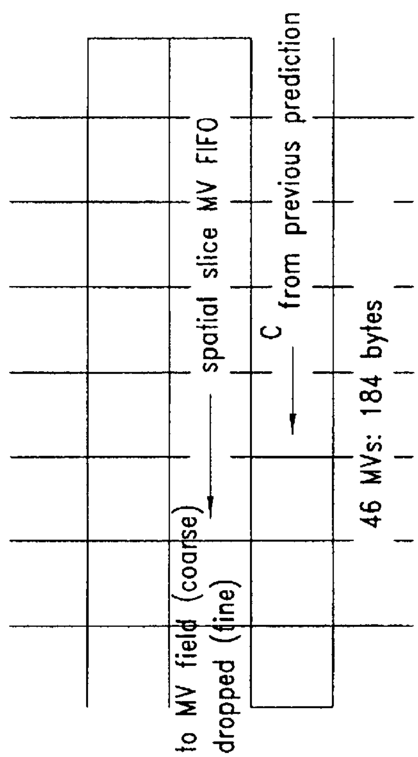
Figure 6C:
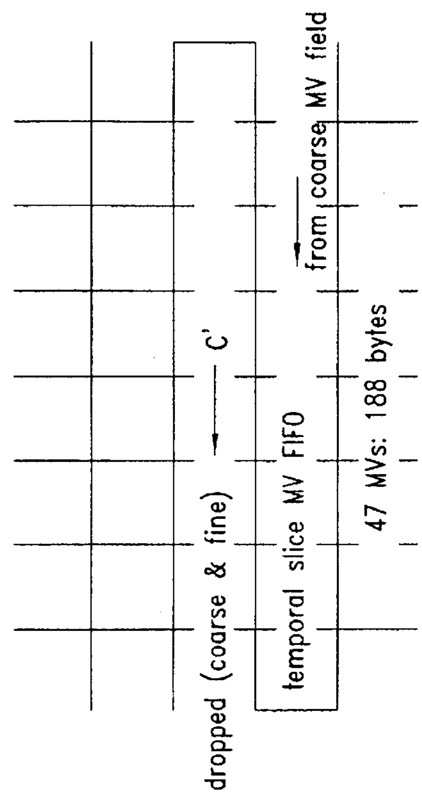
Figure 6A:
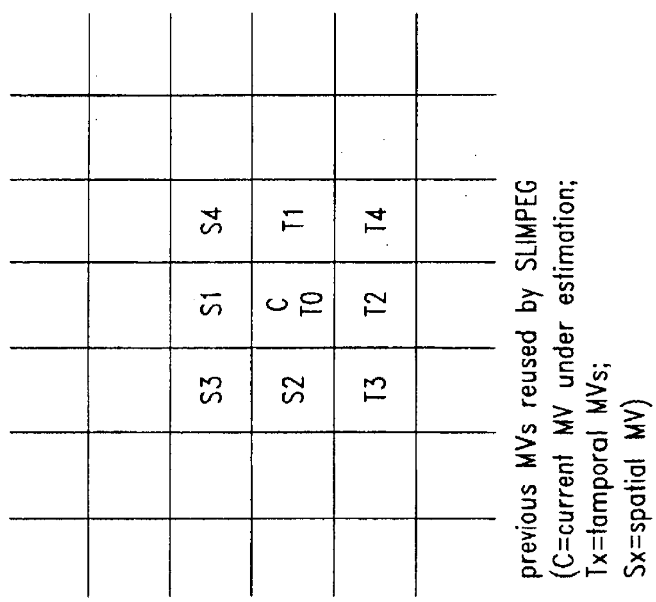
Figure 7:
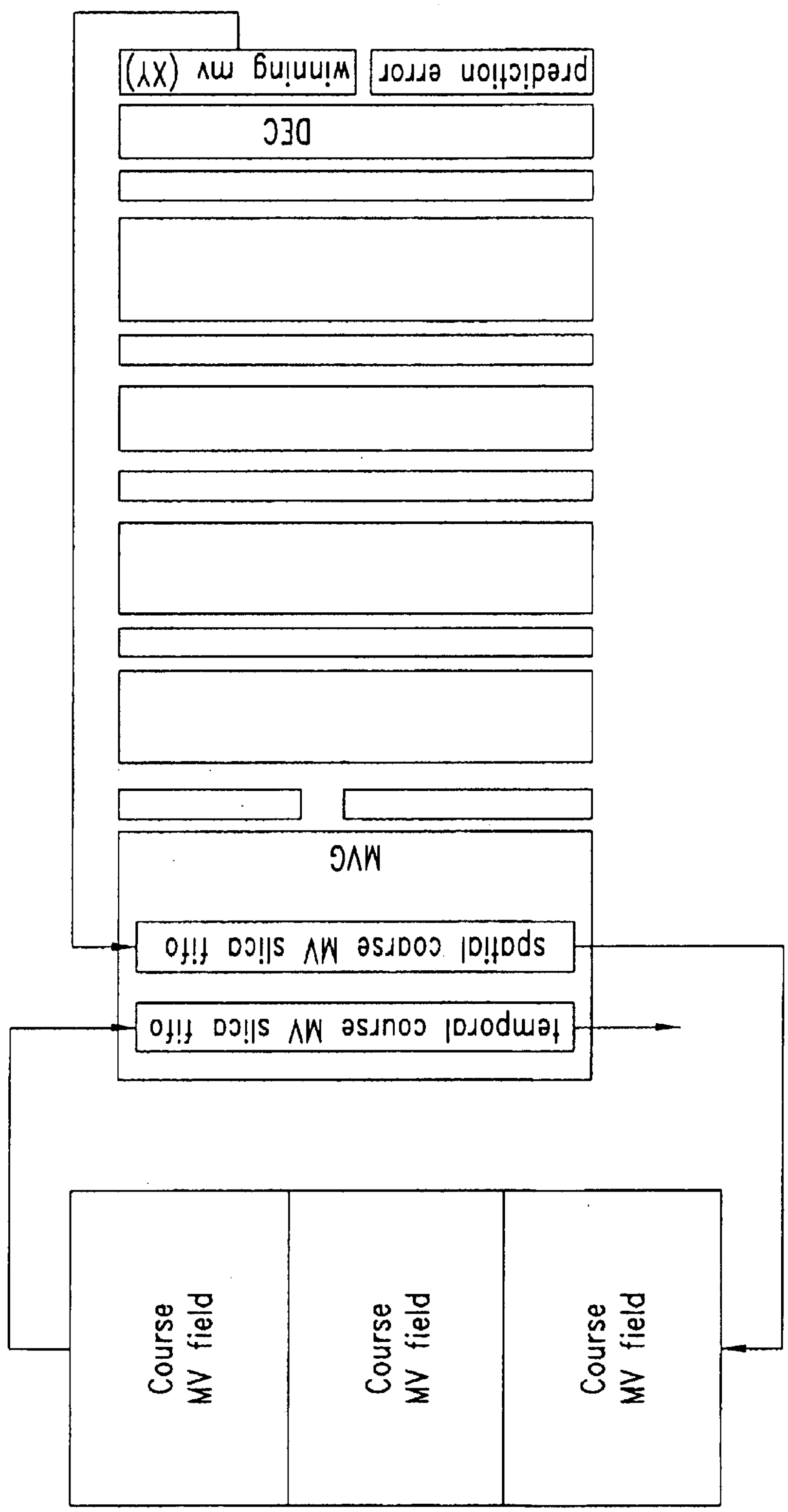
FIG. 7 and FIG. 8 show motion vector fields usage, for coarse and fine search fields, respectively.
Figure 8:
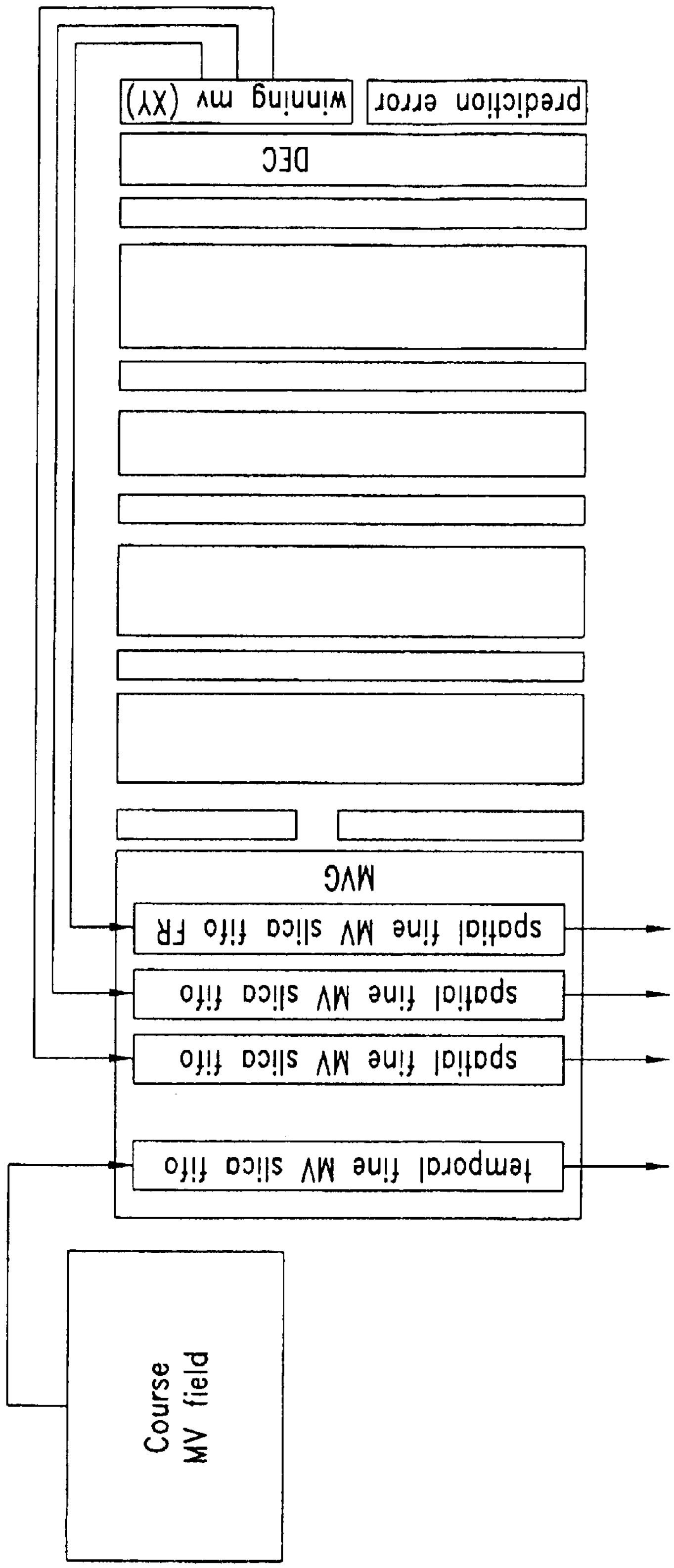

Operation of the slice MV FIFOs and MV fields is as depicted in FIGS. 6, 7 and 8.

The following MV fields are needed in the memory (M<=3 operation):

2 previous coarse search+1 current coarse search=19440 Bytes (max, for PAL). A fourth MV field is not needed because the P picture MV field can be discarded as soon as estimation thereof is finished:

| | | | | | | | |
|---|---|---|---|---|---|---|---|
| Coarse: | I0 | B1 | B2 | P3 | B4 | B5 | P6 |
| Fine: | — | — | — | P3 | B1 | B2 | P6 |
| MVFields: | I0 | B1 | B1, B2 | B1, B2, P3 | B1, B2, B4 | B2, B4, B5 | B4, B5, P6 |

No MV field is needed for the fine search, as all the information needed is kept in the on-board FIFOs and then discarded.

Normally, the SLIMPEG algorithm will need the MV of the macroblocks around the one under prediction. These can be kept in slice FIFO. The slice FIFOs can be divided in two types: a first type, "spatial" FIFOs contain MV resulting from previous estimation of MB in the same frame. More precisely, they will contain the result of the estimations of the last 46 macroblocks. The input of these FIFOs will come from the Decision stage, in the form of the last MV winner for the prediction/search mode to which the FIFO is devoted. The MV coming out of this FIFOs will be either stored in the Coarse MV field in main memory in case of coarse search, or dropped in case of fine search.

The second type will be "temporal" FIFOs, that will contain results from estimations of MBs in previous pictures or previous passes of prediction. This FIFO will contain 47 MVs. These MVs will be loaded from the Coarse MV fields in the main memory. In case of coarse search, the vectors will come from the coarse MV field of the previous (in input order) frame. In case of fine search, the vectors will be the one computed in the coarse pass of the same picture. The MV coming out of these FIFOs will always be dropped.

The following on-board MV slices will be needed:

5 fine search "spatial" MV slices for forward prediction (1 frame, 4 field modes)

5 fine search "spatial" MV slices for backward prediction (1 frame, 4 field modes)

1 fine search "temporal" MV slice 1 coarse search "spatial" MV slice 1 coarse search "temporal" MV slice The total amount is 2400 Bytes.

As these FIFOs are SW operated by a D950 DSP what is needed is the actual space in XY memory; FIFO management will be done by D950. Also note that even if some version of SLIMPEG might not use all the information stored in all the slice FIFOs, (e.g., v5.2 uses only T0 and T1 temporal MV for both fine and coarse passes), these FIFO are kept in the specifications to allow more freedom in the algorithmic enhancement.

With all these mechanisms in place, the MVG will be able to correctly generate MVs to test. The output of the MVC will therefore be:

pred_pos(15:0) X HALF PIXEL absolute predictor position (unsigned)

pred_pos(31:16) Y HALF PIXEL absolute predictor position (unsigned)

mv(15:0) X HALF PIXEL Motion Vector COORD (modulo-2 signed)

mv(31:16) Y HALF PIXEL Motion Vector COORD (modulo-2 signed)

Note that pred_pos=current_mb_pos+mv;

MV control word: a 32-bit bit field, specifying how the related motion vector must be used. The control word layout will be as follows:

SEARCH STEP FLAGS (1:0)
1: COARSE_STEP_FLAG
0: FINE_STEP_FLAG
PREDICTION TYPE FLAGS (7:2)
2: FRAME_PRED_FLAG
3: FIELD_T_ON_T_FLAG
4: FIELD_T_ON_B_FLAG
5: FIELD_B_ON_T_FLAG
6: FIELD_B_ON_B_FLAG
7: DUAL_PRIME_PRED_FLAG
PICTURE TYPE FLAGS (11:8)
8: I_PICT_FLAG
9: P_PICT_FLAG
10: B1_PICT_FLAG
11: B2_PICT_FLAG
12: RESERVED FOR FUTURE USE
PREDICTION DIRECTION FLAGS (15:13)
13: FORWARD_FLAG
14: BACKWARD_FLAG
15: INTERPOLATED_FLAG
NEWS FLAGS (17:16)
16: NEW_CURRENT_MB_FLAG
17: NEW_CURRENT_FRAME_FLAG
VECTOR TYPE FLAGS (21:18)
18: UPDATES_FLAG
19: TEMP_SPAT_FLAG
20: ZERO_MV_FLAG
21: NULL_MV_FLAG
MISC FLAGS (26:22)
22: MULTI_PREDICTION_FLAG
23: MULTI_PREDICTION_LAST_FLAG
24: RESERVED FOR FUTURE USE
25: TAKE_DECISION_FLAG
26: COARSE_OFF_FLAG
31:27: NOT USED/RESERVED

Figure 9:
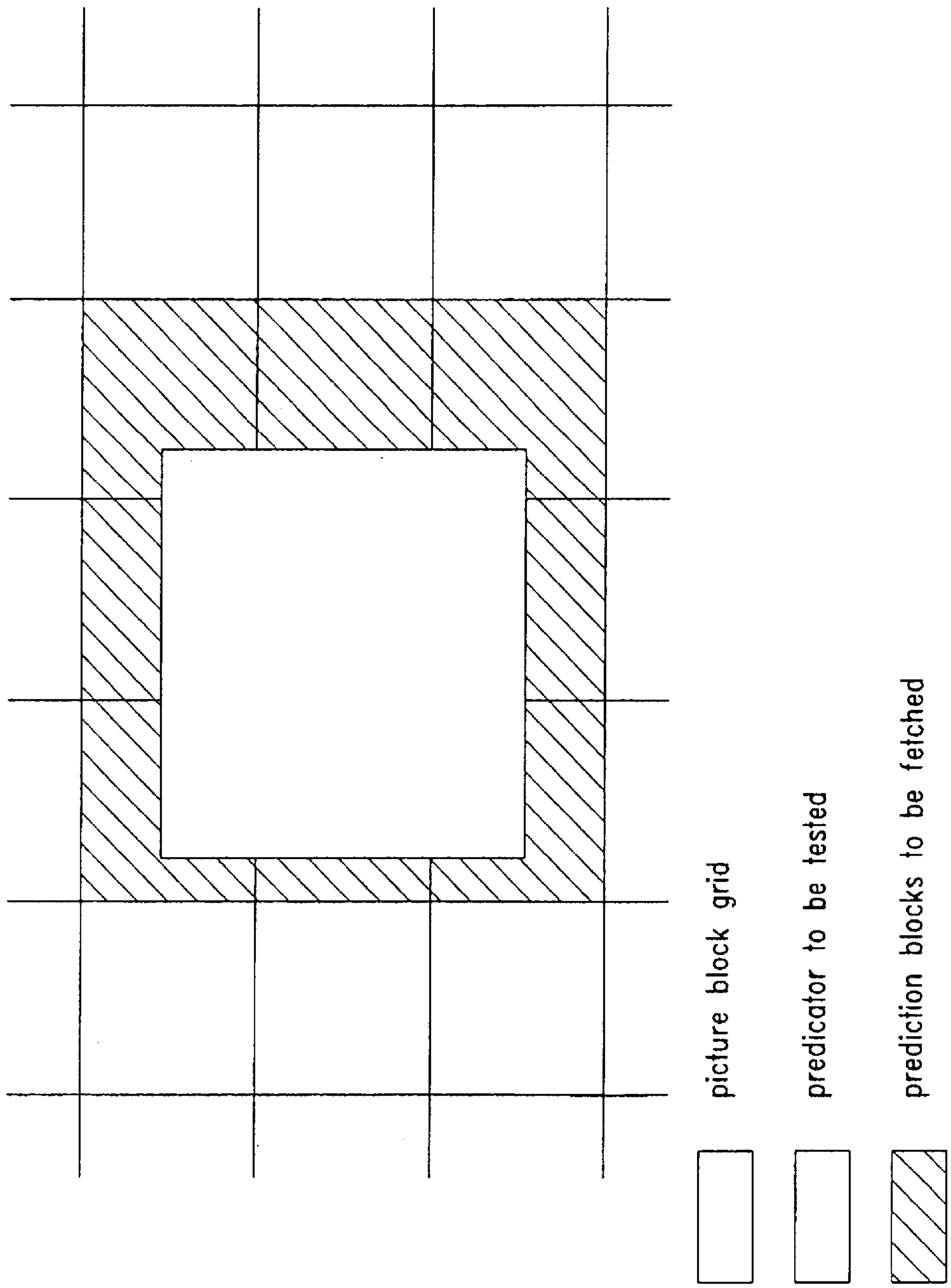
FIG. 9 shows address generator (AG) function of the circuit of the invention, FIG. 10 and FIG. 11, thus latter including two portions designated a) and b) shows predictor fetch (PF) and block cache management in the circuit of the invention.

Each predictor is a 16 by 16 bidimensional array of pixels, that can be located anywhere in the prediction frame. Actually, due to half pixel interpolation, a 17 by 17 array is generally needed. If this 17 by 17 array is applied into the blocks grid, it usually lays into 9 blocks (see FIG. 9).

As the cache is organized in blocks, those 9 blocks need be accessed. This stage then, taking the output of the MVG, outputs in nine sequential cycles all the nine addresses we need to fetch the predictor. As the address space in which the frame buffers is assumed to be contained in one 8 Mbytes chunk of memory (consecutive in address and aligned to an 8 Mbytes boundary, so that the most significant address bits will not change), only 23-bit addresses need be delivered. Of these, the 6 least significant will always be '0', as whole blocks are accessed. Therefore, only 17 significant bits must be generated. In some particular cases not all the nine blocks, but only 6 or even only 4 need be fetched. This happens when the absolute coordinate (i.e., current MB position+motion vector) of the predictors are block aligned, i.e., X|Y_half_pixel_coord REM 16=0. In this case, the PA will still issue all the nine addresses, but it will flag as 'voids' the one that do not need loading. This will save bandwidth.

The output of the block will then be:

control_word, mv, pred_pos as above
address(17): VOID_ADDRESS_FLAG
address(16:0): block_address(22:6)

For nine consecutive cycles for each predictor issued by the MVG. The addressing scan order will be from top to bottom and from left to right. The MV coordinates and control word will be propagated to the next stage.

The PF stage 102 is responsible for physically gathering the 9 blocks in which the predictor to be tested is located. The PF will first look into its block cache for the requested addresses, and, in case of misses, will output a request to the main memory via the STBUS port to bring into the local cache the needed block(s). The PF will be physically composed by a memory, a cache refill engine, and all the logic to handle the inputs from the AG and the outputs to the Predictor Alignment stage.

The cache is logically organized as a 4-way set associative one, with a total memory capacity of 16 KB. Each cache line will contain one block, i.e., 64 pixels, 8-bit each. It is possible to selectively read all the bytes of the block, or only the ones belonging to one field, being it top or bottom. This can be achieved either by a field_select control bit in the memory or by physically splitting the memory into two sub arrays, of the size of 32 pixels each. Accesses to the data loaded in the cache from the PF will always be read ones. Writes to the cache will only happen when refilling the engine. Therefore there is no need for any write-back or write-through capability, nor of any invalidation operation. Cache coherence is not a problem either, as the predictors frames will remain constant during the time of motion estimation. Therefore a very simple cache controller is needed.

Figure 10:
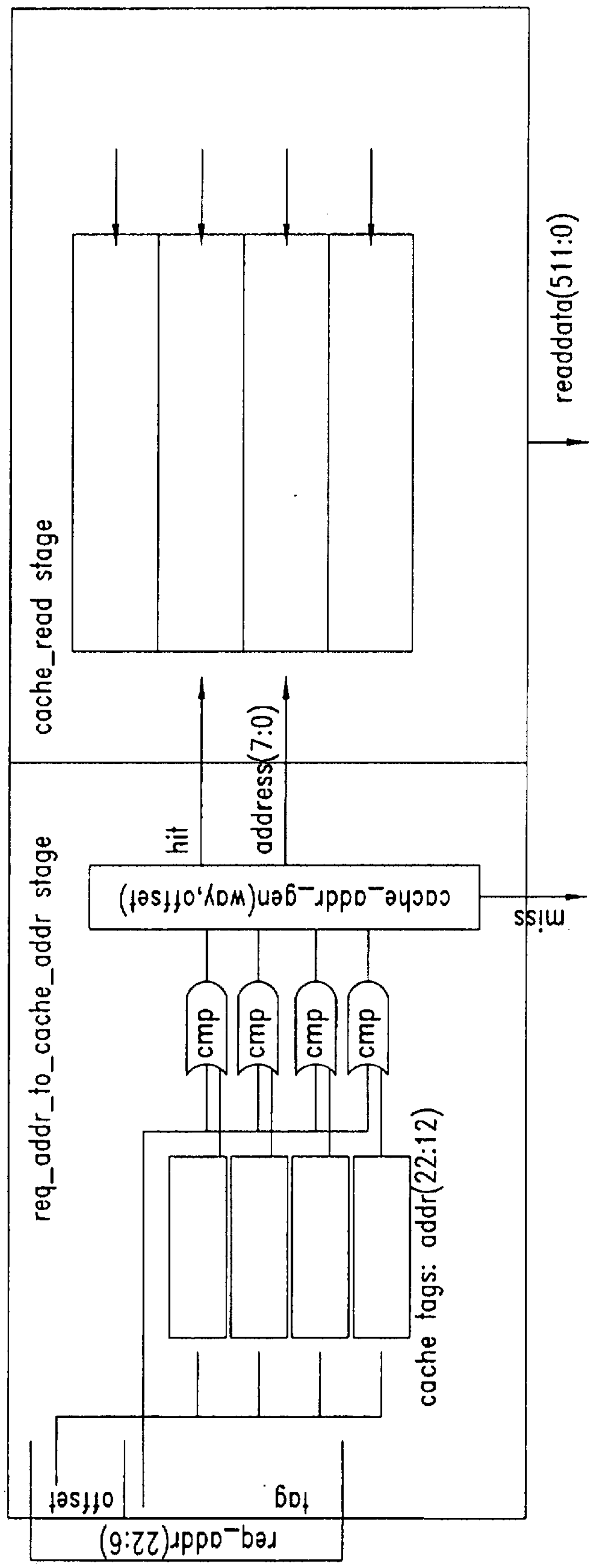
Figure 11A:
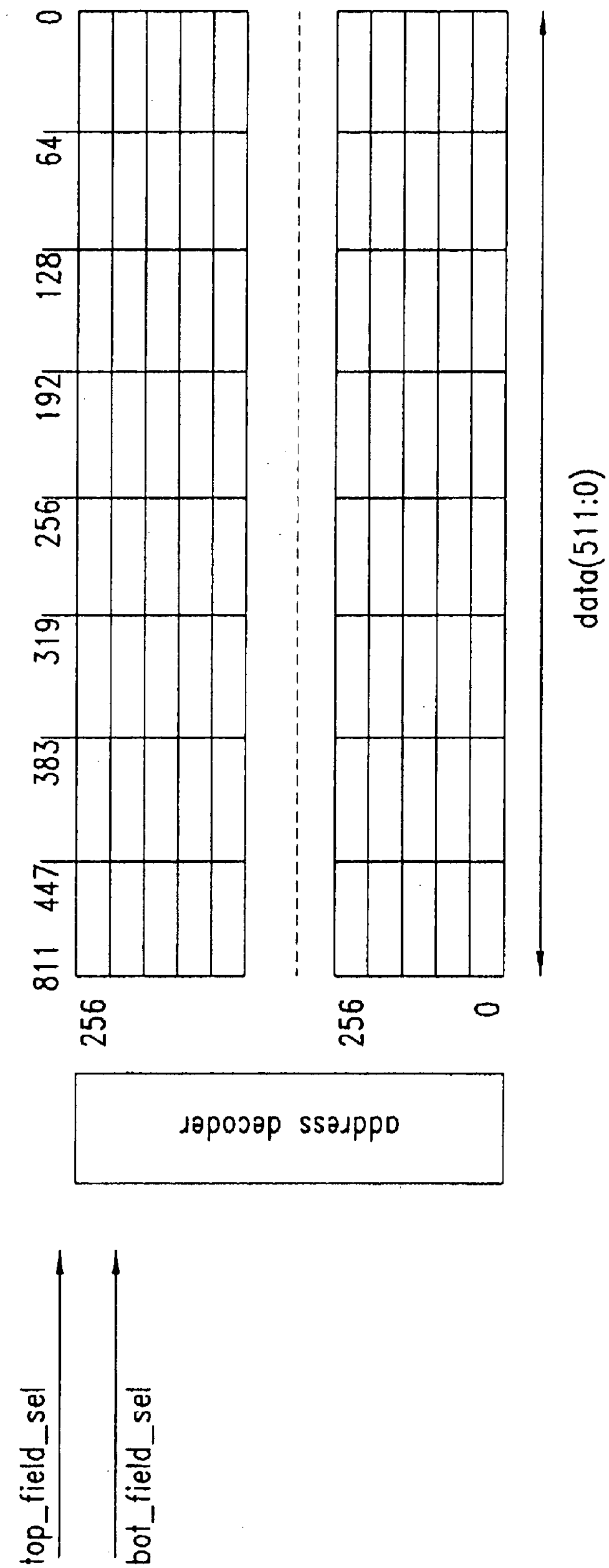
Figure 11B:
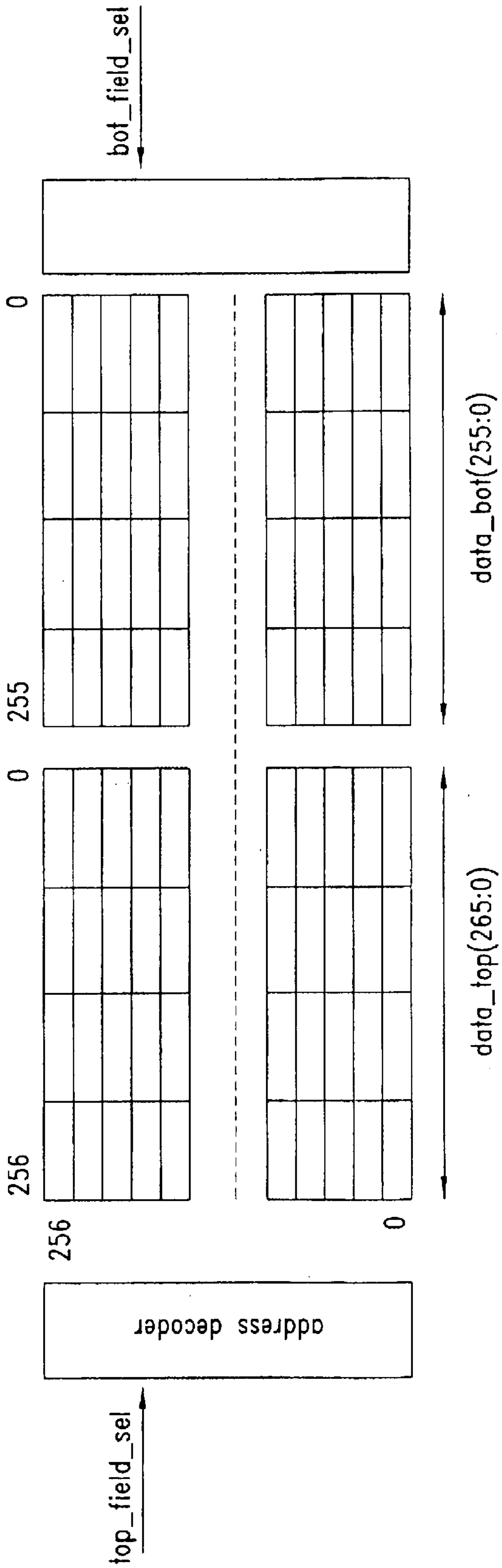

As it has been stated, the cache appears logically as a 4-way one. In a general purpose CPU, this is implemented with a 4-fold split of the physical memory to access simultaneously all the 4 ways, while at the same time performing tag lookup. This would lead to a great power consumption, especially taking into account the very wide cache word (512 or 2×256 bits). In the SHE instead, tag lookup and cache memory access operations will be performed sequentially in two clock cycle. This leads to 75% power saving. The address generation and data utilization are not directly in closed loop, so this latency is hidden by the pipeline (see FIGS. 10 and 11). The requirements for memory will therefore be 1 single ported memory of 256 words of 512 bits each with a field_select control pin, or 2 single ported memories of 256 words of 256 bits each. Stated otherwise cache 4-ways are "emulated" by a single memory: the absence of multiple read in parallel from 4 blocks saves 75% of power; the delay introduced is negligible for S.H.E. operation. Read stages (req_addr to cache_addr; cache_read) are pipelined, so that one pipelined read per cycle can be effected.

Emulated ways are stacked one over the other in a single physical internal memory. Concerning the cache memory architectures, at least two solutions can be used.

A first solution (FIG. 11*a*) is one memory array, with field select pins; this is required because sometimes only half of the data, and sometimes all are needed; this could save 50% power when half the word (i.e., one field) only is required.

As an alternative (FIG. 11*b*), if the memory in A is not available or more power consuming then B, two separate memories of 8 KB each are used; the two memories could even share same address decoder if power optimization is substantial; no bit/byte enable is needed in this case, always read/write the whole word.

Figure 12:
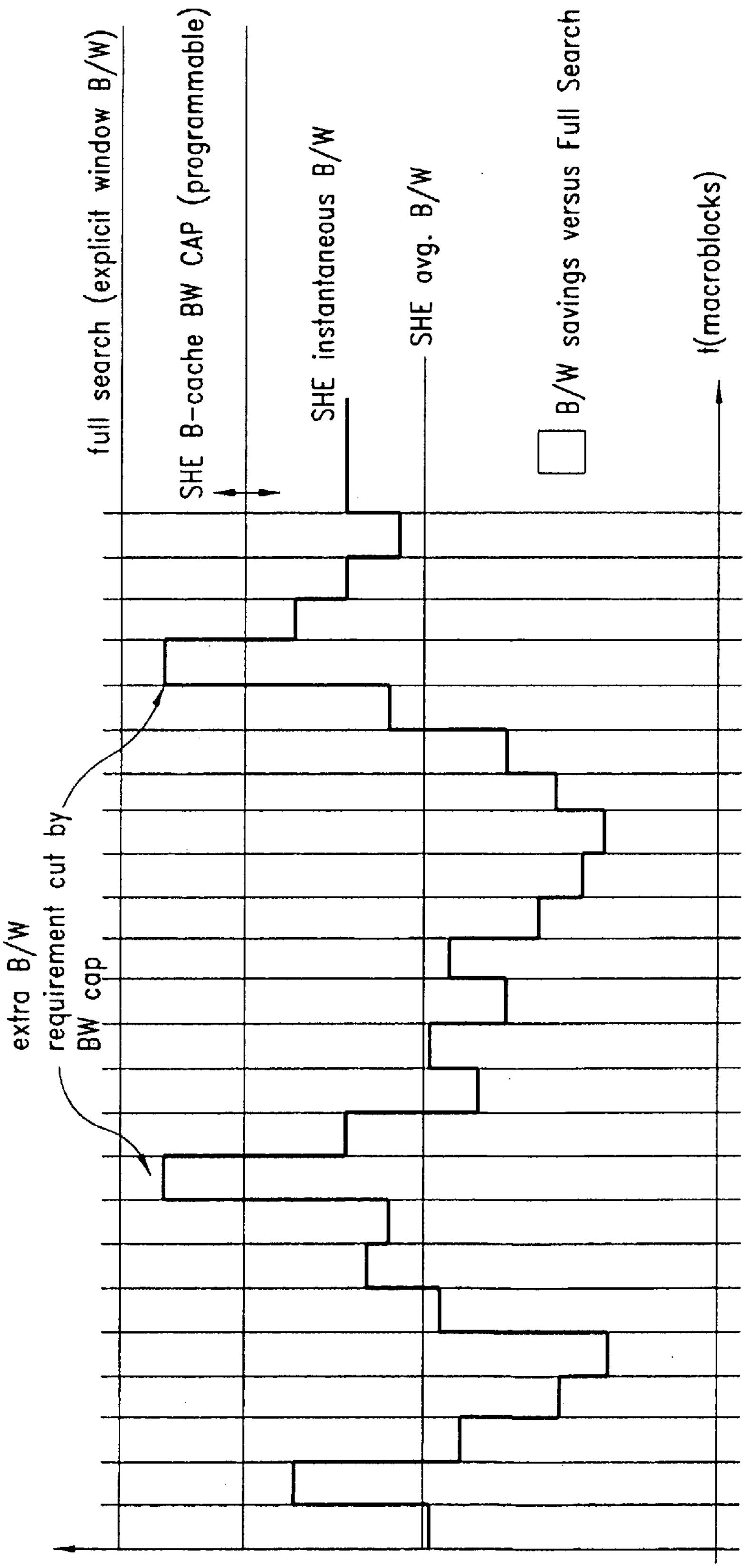
FIG. 12 shows a cached search window with bandwidth cap.

The refill logic will also enforce the "bandwidth cap": a register held into this block and programmable by the system control CPU will tell how many blocks the stage is allowed to request to the main memory for each macroblock's coarse and fine search respectively. Once this limit is reached, the refill engine will not perform any refill of the cache, thus not exceeding the allowed peak bandwidth in every macroblock period (see FIG. 12). Of course, in this case the PF will not be able to construct the 9-blocks region from which to extract the predictor, and we will have to discard this motion vector, and not to count it among the candidates for the final predictor winner. This is indicated by setting the NULL_MV_FLAG in the control word. The data used to fill that missing block(s) will of course be "don't care" and implementation dependent, as the predictor will never be considered as a valid candidate.

If the address to be fetched is flagged as VOID_BLOCK_ADDRESS the PF stage will not generate any access to the cache, and fill the block with "don't care" and implementation dependent data, as they will not actually be used for the predictor construction.

In case of a miss happening, this will of course cause all the pipeline to stall for as long as it takes to load the missing block. The stall will be propagated with the normal stages handshake mechanism, meaning that the delay in outputting the missing block and in consuming the subsequent inputs will cause the other stages to stall for the appropriate time. The addresses generated to the STBUS port will be composed by several portions, generated as follows:

(31:23): the 8-Mbyte region containing the frames, constant, held in a configuration register (22:6): block address, as from AG stage (5:0): block scansion: these will increment according to a fixed pattern to scan the whole block memory.

To simplify the refill engine and for more optimized memory accesses, the whole blocks will be loaded in cache, not single fields, even if the miss is caused by a field predictor.

The refill engine will be able to perform some look-ahead on the addresses requested by the AG stage, in order to try and hide the stall latency. This can be achieved by decoupling the tag lookup task from actual cache memory access with an intermediate buffer, with a view to find well in advance the next miss and proceed to pre-load the block from memory. In fact, at the first miss, the cache memory access will stall, but tag lookup can continue to determine the next miss, taking care of the tags configuration after that refill. As miss rate is in the order of 2%, there is a fair chance that the next miss will be well away from the current one. In fact, if it would be 10 or more addresses later, we could hide up to 10 cycle of the next miss, provided we have a 10 location buffer between tag look-up and cache memory access. This buffer will have to hold the cache memory line that the address generated by the AG will hit, up to the next miss or to buffer fullness.

The output of this stage to the Predictor Alignment (PA) block 103 will therefore be, in 9 consecutive cycles, the 9 blocks in which the actual predictor is found. In case the predictor is a frame predictor, the whole 64 bytes for each block will be output. In case it is a field predictor, only the relevant field for each block will be accessed in cache and output to the PA, to save power consumption.

control_word, mv, pred_pos as above pixels(511:0): one prediction block (frame prediction)

pixels(255:0): one prediction block (field prediction)

pixels(511:256): "don't care" (field prediction)

The predictor alignment (PA) 103 will take the data of the 9-block area in which the actual predictor resides and extract it with all the relevant operations, being it actual extraction of the 17 by 17 (general case, with half pixel interpolation), horizontal and/or vertical half pixel interpolation, and bi-directional/dual prime prediction interpolation. This operation is achieved by reformatting the block-based output of the PF into lines-of-macroblock output and by selecting the 17 by 17 array out of the 24 by 24 original one.

The reformatting is done through a buffer between PF and PA stages. This will be in principle a 24 by 24 pixels buffer, filled by the PF and read by the PA.

To extract from the 24 by 24 array, corresponding to the 9 blocks incoming from PF, the 17 by 17 needed we need to select the 17 appropriate row out of the 24 given; this is done by simply not selecting the 7 rows not needed. To extract the 17 pixels we will just use a simple shifter, controlled by the least significant bits of the X absolute coordinate of the predictor.

Figure 13:
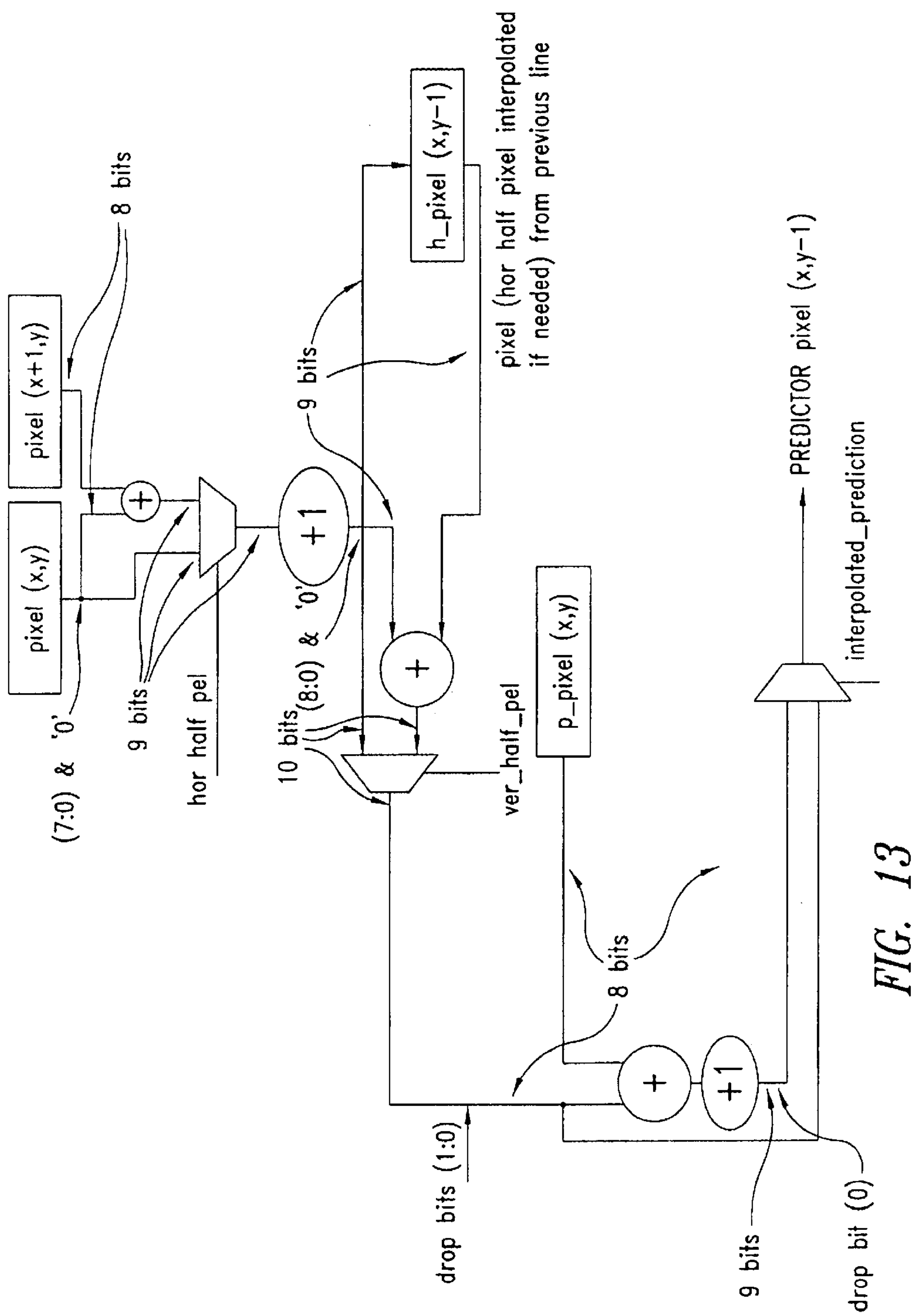
FIG. 13 shows predictor alignment (PA) interpolation blocks, FIG. 14 show a so-called distengine implementation within the framework of the invention.

Half pixel interpolation will be performed on-the-fly by 8-bit adders, 9-bit increment and discarding as appropriate during processing the lsb's to return to 8-bit accuracy. Further details are shown in FIG. 13.

This arrangement will save some of the adders needed for half pixel interpolation, as a "conventional" implementation can be envisaged using 3 adders plus one increment per pixel, while here 2 adders plus an increment are used one pixel latch register will also be saved, as store the result of horizontal interpolation of the line above (needed for vertical interpolation), instead of the two original pixels, will be started.

ver_half_pel and hor_half_pel indicate if half pixel interpolation is needed; these signals stay constant for the whole predictor.

A temporary buffer of 16 by 16 pixels is also needed to perform predictors interpolations, for bi-directional and dual-prime prediction. In this case, the first predictor is stored, to be then interpolated on-the-fly when the second component becomes available. For this purpose, a third set of interpolators is needed. Additional details are shown in FIG. 13.

The output will be a single line of 16 pixels per clock cycle. This output will last for 16 cycles in case of frame mode matching, or 8 cycles for field mode. Another flag signaling the last line for the current matching will be output in order to allow the distengine to stop the accumulation of the MAE and output it to the decisions block.

control_word, mv, pred_pos as above last_line active when last line of the predictor is output pred_pixel(127:0) the predictor's pixels to test The stage designated 104 (i.e., the CMB Fetch and Distengine, briefly CFD) is responsible for computing the actual MAE of the selected MV. As the Current MacroBlock (CMB) is not used by any of the preceding stages, it is fetched from memory. Fetch will happen prior to CMB usage in order to hide the load latency. So, while processing CMB n, CMB n+1 will be fetched when the STBUS port is not used to load predictors blocks. In order to do this, a temporary buffer of 256 pixels is needed, in addition to the 256 pixels needed for the CMB under estimation.

The P CMB feed through described in the foregoing is implemented here, with a simple macroblock buffer, to hold the coarse search macroblock, optionally post-processed by the MCNR. Therefore there is a requirement for the MCNR to be able to complete its filtering in a macroblock period. The MCNR will start processing the macroblock as soon as the coarse search finishes, and ideally should finish before the end of the current macroblock period. Because coarse search is far less complex than fine search, it is fair to assume it will take less time than fine. Therefore it must complete before ½ the macroblock period. MCNR must then complete its processing before the end of the period, having at least ½ macroblock period to complete. It will overwrite the CMB in memory, and also the copy in the feed through buffer, so that fine search will use it correctly. In case the delay between coarse and fine is greater than one MB period, fine search will reload the correct CMB directly from memory, once again assuring correct operation.

The total buffering means sums up to 256*3=768 bytes. While processing the CMB, one macroblock line (16 pixels=128 bits) is accessed at a cycle. Therefore, this 3-macroblock buffers can be implemented by a single ported single memory with 48 words of 128 bits each. In this case, while fetching and writing to this memory the next CMB, the distengine will not be able to process. But as this stall can be limited to 16 cycles, this is not forecast as a major problem. The alternative implementation would require 256*3*8=6144 flip-flops.

Figure 14:
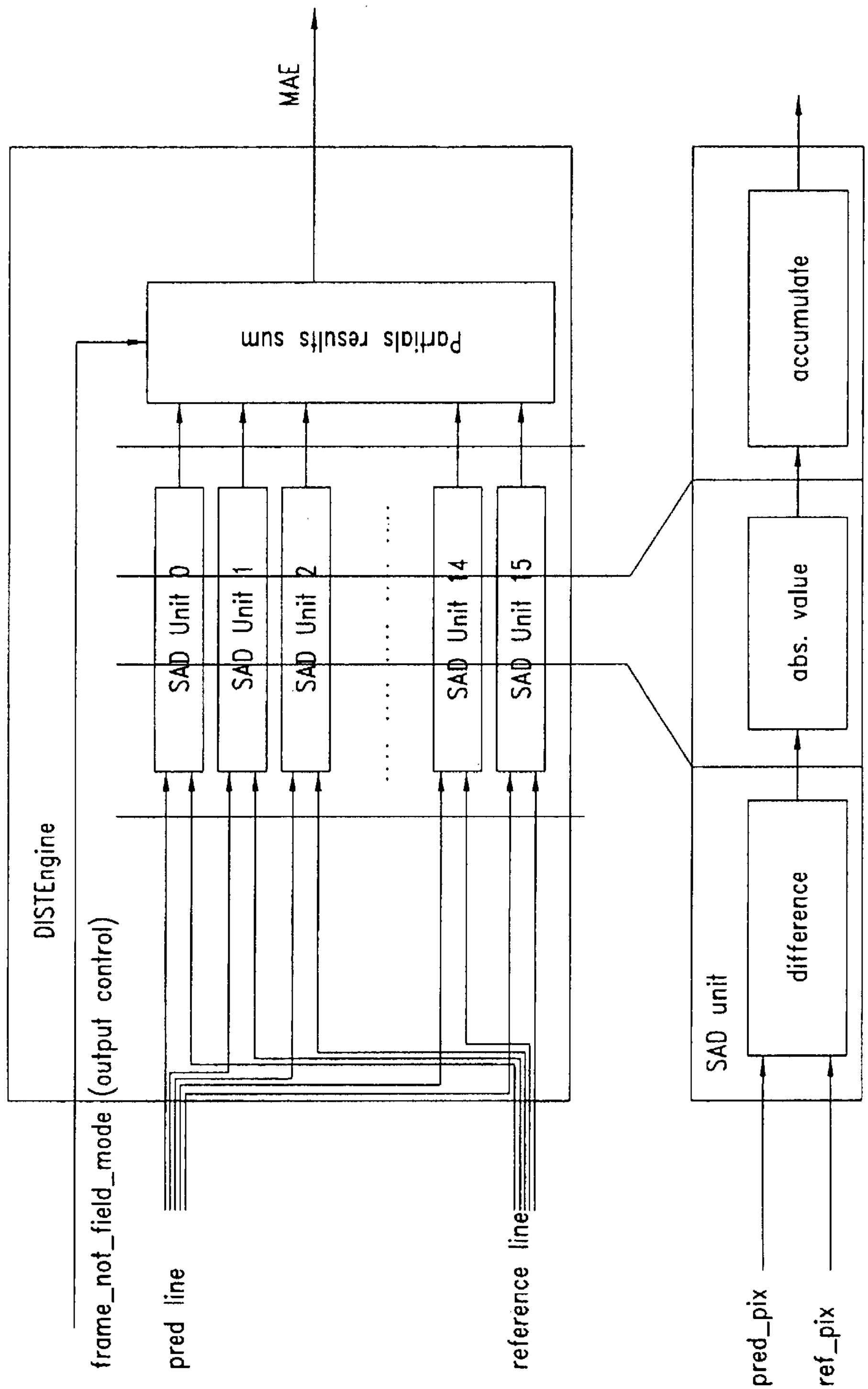

As far as the distengine implementation is concerned, the microarchitecture is as shown in FIG. 14.

In order to speed up the decision function block task, the Distengine will also compute the mean of the prediction error and current macroblock. The Distengine will be programmable (via control word bits) for field or frame matching. In the first case the predictor/current will contain 8 lines; in the second, it will contain 16 lines. Another issue arises for compatibility with MPEG-4 and H263 block (vs. Macroblock) matching. For example, H263 standard allows 8×8 pixels frame mode prediction. To allow multi-standard capability, SHE should therefore support these 8×8 mode as well. This could be implemented by adding a flag in the control word to signal this 8×8 prediction mode is enabled. The stages before distengine could in a first implementation continue to fetch the standard 17 by 17 area. When the prediction/current is fed to the distengine, it will gather the result from the 8 by 8 frame only. A second most efficient implementation would be to make the AG, PF, PA stages sensitive to the flag as well. This would increase marginally logic complexity, but will reduce data movement, with beneficial effects on power consumption.

control_word, mv, pred_pos as above mae(15:0) mae value for this matching; unsigned integer quantity pred_err_sum(16:0) sum of the pixel by pixel prediction error, modulo-2 signed integer quantity cmb_sum(15:0) sum of all the cmb pixels; unsigned integer quantity; this can be computed only once per estimation and then gated out for power consumption issues The decision stage 105 is actually split in two sub functions: one to gather all the partial results of the current block estimation, the other to compute the macroblock coding decision functions on the motion estimation winner. To be able to compute the coding decision functions, the data of the current macroblock under estimation and its best predictor, plus the no_mc predictor for P pictures are needed. Therefore, a RAM will be needed in order to store the winner for each prediction mode. This leads to the following memory requirements:

| | |
|---|---|
| For P pictures: | |
| Current macroblock: | 256 bytes |
| Frame mode predictor winner: | 256 bytes |
| No_mc predictor: | 256 bytes |
| Field/dual_prime top winner: | 128 bytes |
| Field/dual_prime bottom winner: | 128 bytes |
| Dual_prime temp buffer: | 128 bytes |
| Temp buffer (incoming predictor): | 256 bytes |
| Total: | 1408 bytes. |
| For B pictures: | |
| Current macroblock: | 256 bytes |
| Frame mode predictor winner: | 256 bytes |
| Field/dual_prime top forward winner: | 128 bytes |
| Field/dual_prime bottom forward winner: | 128 bytes |
| Field/dual_prime top backward winner: | 128 bytes |
| Field/dual_prime bottom backward winner: | 128 bytes |
| Temp buffer (incoming predictor): | 256 bytes |
| Total: | 1280 bytes. |

I pictures will just need Current MB for DCT type decision.

Additional information that needs to be stored are motion vector (32 bits) and MAE value (16 bits) for each of the mode winners and current predictor.

When a new MAE arrives, it will be compared with the current winner for the mode to which the predictor belongs, and if less than or equal, it will replace the current winner. The memory will actually be organized as circular buffers, so that the position of each mode winner can be in different part of the memory, in order not to physically mode data when a mode winner is updated. This will require a few additional storage bits for each mode winner, to point to the position in memory where the predictor resides. Because each predictor is 128 or 256 bytes, one just needs to identify which of the 128-byte regions are used by each predictor; because 12 of these regions in 1.5 KB of memory exist, only 4 bits are needed for this purpose. To be sure that memory fragmentation is avoided, new field mode predictions will be saved in the uppermost free part of the memory, while new frame mode predictors will occupy the lowest part of the memory available.

The second task that needs to be done is the decision of the macroblock coding type. For this purpose the current macroblock, the prediction winner and the no_mc winner for P pictures are needed. The functions needed to compute are intra_macroblock SMA, inter_macroblock SMA, no_mc SMA, and then DCT field_difficulty and frame_difficulty.

This task is done either sequentially or in parallel with motion estimation. In the first case the issue of motion vectors will be stopped to allow the mode winners memory to be accessed by the decision functions logic. Alternatively a double banked predictors memory can be used, which will require to double the predictors winners memory, adding 1.5 KB of memory. It would then be possible to swap banks between motion estimations partial results gathering and the coding decision task.

Once all the decisions have been taken, the current MB, its computed MV with the final luma predictor and prediction error are available. These results can be sent via DMA in memory into a "prediction error frame buffer" ready to be used by the loop encoder. The associated MV and coding decision taken can be put in an appropriate data structures in memory. In addition, an extra function of chroma prediction gathering could be inserted in the engine.

The engine will have also to feed back the winner coarse & fine MV winner to the MVG MV fifo for it to be able to recursively generate vectors.

Figure 15:
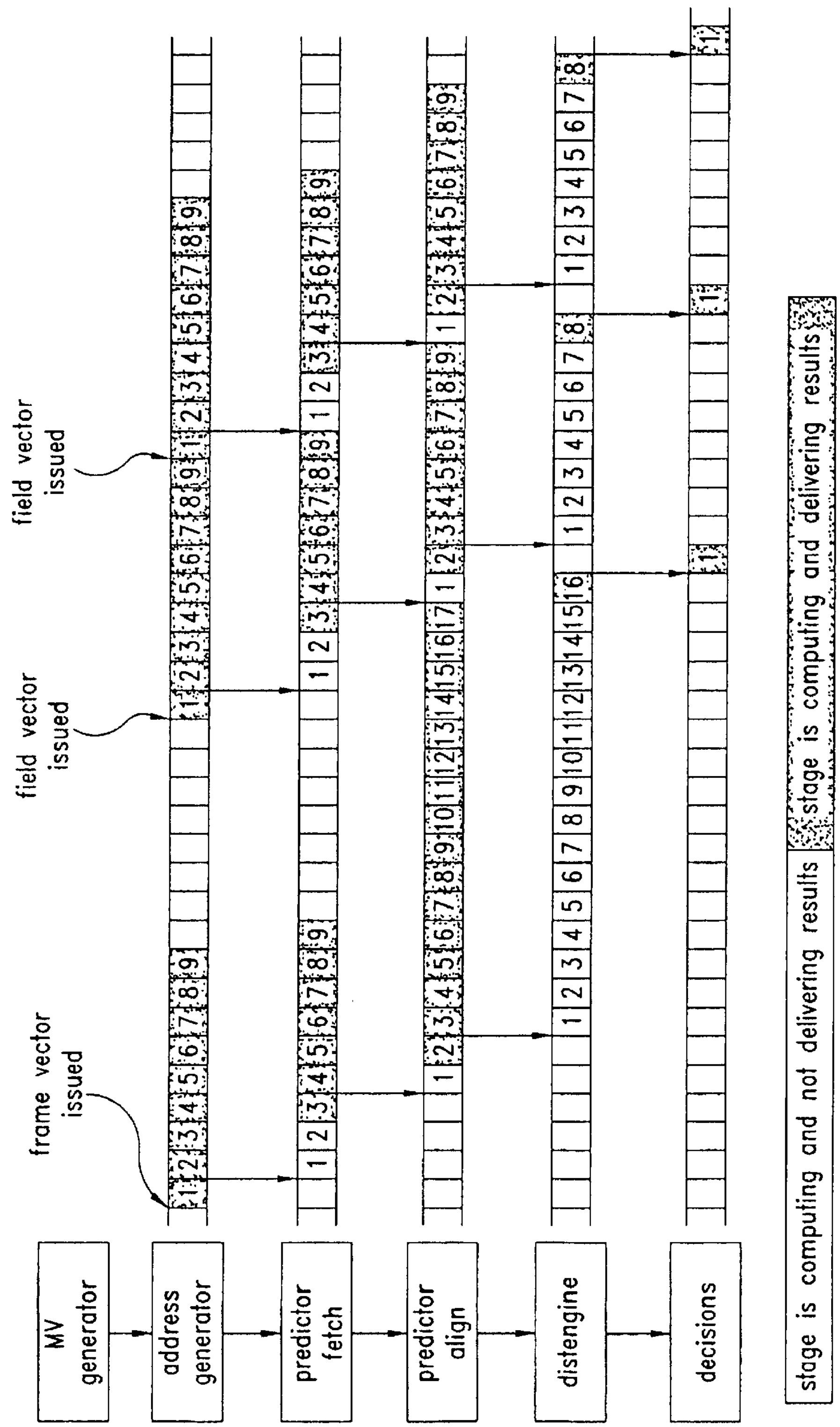
FIG. 15 shows an example of pipeline data flow in the circuit of the invention.

Finally the flow of a motion vector to be tested through the pipeline, as depicted in FIG. 15, will be described in detail. It must be understood that between each of the blocks there will be buffering means to be able to decouple to a certain degree the operations of the stages. These buffers will be working as FIFO with overflow/underflow control, in order that no data will be lost in case the buffers are full and no data is output if buffer is empty. This will be done through handshake of each stage input and output to the buffers. The stages will stall in case the output buffer is full and/or the input buffer is empty. This will allow to treat correctly events like cache misses, MVG delays, and so on. The situation depicted in FIG. 15 assumes that all these buffers are empty at the moment when the MV in the example arrives. For power consumption issues, it is recommended that when a stage is stalling due to buffer unavailability, the clock will not tick, i.e., the clock will be gated by the input__buffer__empty/output__buffer__full signals.

As soon as a motion vector is issued from the MVG, it will go to the address generation input buffer. The size of this buffer is characterized in terms of latencies. The address generator will then pick up the vector and issue in nine consecutive cycles the 9 addresses needed to extract the predictor. Some of these might be flagged as "void" as the predictor will not actually contain pixels from that block, but in any case the processing will still take 9 cycles. Addresses flagged as void contain "don't care" and implementation dependent data.

Those addresses will go to the fetch input buffer. It is recommended that at least 8–10 positions will be available in this buffer, to perform efficient miss look-ahead as previously described. Once in the fetch stage the addresses will be compared with the cache content, and if no miss happens, the blocks are output in nine consecutive cycles. In case any miss happening, the output of the block that generated the miss will be delayed by the time taken to load the data from main memory. This in turn will make all the previous and subsequent stages to stall due to buffers being full or empty, allowing correct handling of the miss stall.

The 9 blocks will be then output directly to the PA stage. In order to be able to extract prediction lines out of the blocks, a 'block to lines' buffer of at least 3 blocks, or 6 blocks for more efficient implementation is needed. A 3-block buffer will in fact add a 3 cycle latency every time we need to refill it once it has delivered the initial content. This can be hidden with a 6 blocks buffers, so that the next 3-blocks data can be received while the first 3-block lines are delivered. With this buffer arrangement, delivery of one line of predictor (apart from first cycle delay in case of vertical half pixel) can be sustained for each cycle from the PA.

The PA will start, as soon as it has available the first line of the predictor, to output it to the distengine in 8 (field mode) or 16 (frame mode) subsequent clock cycles. The suggested microarchitecture of the PA block will use one initial delay cycle prior to output the predictor in case of vertical half pixel interpolation, and no delays when vertical half pixel is not used. No buffering is needed between PA and CFD, and the transfer will be based on simple handshake mechanism. The distengine will output the MAE result, which can be taken without any buffering by the decisions block.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block;

a current macroblock fetch and distengine block for retrieving said macroblock data based on respective memory addresses extracted by said address generator block and for processing said macroblock data according to a given function;

a decision block for collecting retrieved macroblock data as partial results and selecting the best result therefrom; and temporal noise reduction means attached at the output of the decision block to noise-reduce said image data.

2. The circuit according to claim 1 wherein said motion vector controller block is implemented as a DSP.

3. The circuit according to claim 1 wherein said motion vector controller block is arranged to run a microcode.

4. The circuit according to claim 3 wherein said motion vector controller block has associated therewith a memory, preferably of the flash type, for storing said microcode.

5. The circuit according to claim 1 wherein said circuit is arranged to perform two distinct estimation steps, namely a coarse search and a fine search, respectively, of said image data, said estimation steps being carried out in parallel on different macroblocks.

6. The circuit according to claim 5 wherein the circuit includes time-sharing hardware resources to generate in parallel the result of the coarse search for a macroblock and the result of the fine search for another macroblock.

7. The circuit according to claim 1 wherein said motion vector controller block is arranged to perform at least one ancillary function selected from the group consisting of scene change detection, inverse 3/2 pull down, interlace/progressive content detection f__code adaptation.

8. The circuit according to claim 1 wherein said motion vector controller block includes a local memory adapted to receive slices of said motion vectors.

9. The circuit according to claim 1 wherein said address generator block is arranged to output the addresses required to fetch said predictor data in sequential cycles.

10. The circuit according to claim 1 wherein said predictor fetch block has associated therewith an internal memory managed as a cache memory.

11. The circuit according to claim 10 wherein said predictor fetch block loads the search windows pixels of said image data selectively and/or buffers them in said internal memory by dynamic allocation.

12. The circuit according to claim 1 wherein said fetch and distengine block applies, as said given function, the mean absolute error over a given macroblock of the sum of absolute differences produced by pixel comparison.

13. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block;

a current macroblock fetch and distengine block for retrieving said macroblock data based on respective memory addresses extracted by said address generator block and for processing said macroblock data according to a given function;

a decision block for collecting retrieved macroblock data as partial results and selecting the best result therefrom; and wherein said circuit is arranged to perform two distinct estimation steps, namely a coarse search and a fine search, respectively, of said image data, said estimation steps being carried out in parallel on different macroblocks, and wherein said noise reduction means perform motion compensated noise level detection and reduction based on the motion vectors resulting from the coarse search, preferably by using as inputs the coarse search current macroblock and its predictor block.

14. The circuit according to claim 13 wherein said noise reduction means output a noise-reduced version of the current macroblock that will overwrite the noise corrupted one.

15. A coprocessor circuit for processing image data in digital form, including:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block;

a current macroblock fetch and distengine block for retrieving said macroblock data based on respective memory addresses extracted by said address generator block and for processing said macroblock data according to a given function;

a decision block for collecting retrieved macroblock data as partial results and selecting the best result therefrom; and wherein said motion vector controller block is arranged to perform at least one function selected from the group consisting of counting the cycles spent to estimate the current macroblock, inserting stall or power down cycles or additional motion vector tests to ensure synchronization with input data.

16. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses, said motion vector controller block includes a local memory adapted to receive slices of said motion vectors, said motion vector controller block has associated therewith slice FIFOs of a first type containing motion vector data resulting from previous estimation of the macroblock in the same frame and of a second type containing results from estimations of macroblocks in previous pictures or previous passes of predictions;

an address generator block for extracting respective memory addresses from said motion vector values;

a predictor fetch block for retrieving said predictor data based on respective memory addresses extracted by said address generator block;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom.

17. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses; and an address generator block for extracting respective memory addresses from said motion vector values, said address generator block arranged to issue as voids at least some of the memory addresses not requiring loading when the absolute coordinates of the predictors are block aligned;

a predictor fetch block for retrieving said predictor data based on respective memory addresses extracted by said address generator block;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom.

18. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values, said address generator block is arranged to output the addresses required to fetch said predictor data in sequential cycles;

a predictor fetch block for retrieving said predictor data based on respective memory addresses extracted by said address generator block, wherein said predictor fetch block has a bus access limiter coupled to the cache refill engine;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom.

19. The circuit according to claim 18 wherein said bus access limiter is arranged for clipping high-bandwidth peaks.

20. The circuit according to claim 18 wherein said bus access limiter acts at a macroblock by macroblock level.

21. The circuit according to claim 18 wherein said bus access limiter has a selectively variable maximum allowed bandwidth value.

22. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block, wherein said predictor fetch block has associated therewith an internal memory managed as a cache memory, said cache memory organized as a multiway, preferably as a 4-way set associative memory;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom.

23. The circuit according to claim 22 wherein said predictor fetch block is arranged to permit selective reading of blocks in each line of said cache memory, thereby permitting all the bytes of each block or only the blocks belonging to one field to be selectively read.

24. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block, wherein said predictor fetch block has associated therewith an internal memory managed as a cache memory, said cache memory is arranged to permit writing of data therein only when refilling the respective refill engine;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom.

25. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block, wherein said predictor fetch block has associated therewith an internal memory managed as a cache memory, wherein within said cache memory tag lookup and access operations are performed sequentially in subsequent clock cycles;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom.

26. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block, wherein said predictor fetch block has associated therewith an internal memory managed as a cache memory, that is physically composed of a single piece instead of N, where N is the number of ways in which said cache is logically organized;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom.

27. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block, wherein said predictor fetch block has associated therewith an internal memory managed as a cache memory, and an intermediate buffer to decouple a tag lookup task from memory access in said cache memory;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom.

28. The circuit according to claim 27 wherein, at the first miss, the cache memory access stalls, but tag lookup continues to determine the next miss, preferably by taking care of the tags configuration after that refill.

29. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block, wherein said predictor fetch block has associated therewith an internal memory managed as a cache memory, wherein said cache memory is arranged, preferably at the refill engine level, to find in advance the next miss and proceed to pre-load the block from memory;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom.

30. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block, said predictor fetch block has associated therewith a predictor alignment block to reformat a block-based output of said predictor fetch block into a lines-of-macroblock output and selecting a sub-array out of the original array or the output of said predictor fetch block;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom.

31. The circuit according to claim 30 wherein said predictor alignment block includes a respective buffer filled by said predictor fetch block.

32. The circuit according to claim 30 wherein said predictor alignment block is arranged to perform interpolation of the data transferred from said predictor fetch block towards said fetch and distengine block.

33. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block, wherein said predictor fetch block is arranged to permit selective reading of blocks in each line of said cache memory, thereby permitting all the bytes of each block or only the blocks belonging to one field to be selectively read;

a current macroblock fetch and distengine block for retrieving said macroblock data based on respective memory addresses extracted by said address generator block and for processing said macroblock data according to a given function, wherein said fetch and distengine block is arranged as a monodimensional array of computing elements; and a decision block for collecting retrieved macroblock data as partial results and selecting the best result therefrom.

34. The circuit according to claim 33 wherein said monodimensional array is a monodimensional array of SAD elements.

35. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block;

a current macroblock fetch and distengine block for retrieving said macroblock data based on respective memory addresses extracted by said address generator block and for processing said macroblock data according to a given function, wherein said fetch and distengine block includes a macroblock buffer to store coarse search macroblocks in order to permit processing each macroblock as soon as the coarse search finishes;

a decision block for collecting retrieved macroblock data as partial results and selecting the best result therefrom; and wherein said circuit is arranged to perform two distinct estimation steps, namely a coarse search and a fine search, respectively, of said image data, said estimation steps being carried out in parallel on different macroblocks.

36. The circuit according to claim 35 wherein said macroblock buffer is implemented as single ported memory.

37. A coprocessor circuit for processing image data in digital form, comprising;

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block;

a current macroblock fetch and distengine block for retrieving said macroblock data based on respective memory addresses extracted by said address generator block and for processing said macroblock data according to a given function, wherein said fetch and distengine block includes a programmable distengine module for field or frame matching; and a decision block for collecting retrieved macroblock data as partial results and selecting the best result therefrom.

38. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom, said decision block having a first module to gather the partial result of current block estimation and a second module to compute the macroblock coding decision functions on the motion estimation winner.

39. The circuit according to claim 38 wherein the circuit includes a decision memory, preferably a RAM, to store the winner for each prediction mode.

40. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom, the decision block is arranged to compare new data obtained by applying said given function with a current winner for the mode to which the predictor belongs and if the current winner is less than or equal the new data, the new data will replace the current winner.

41. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom, said decision block performs decision of the macroblock coding type sequentially or in parallel with respect to motion estimation.

42. The circuit according to claim 41 wherein said decision of the macroblock coding type is performed sequentially with respect to motion estimation and in that the issue of motion vectors is stopped to allow the mode winners memory to be accessed.

43. A coprocessor circuit for processing image data in digital form, comprising:

a motion vector controller block for generating, starting from the image data, motion vector values including predictor data and macroblock data relating to a current macroblock of the image data to be estimated, the predictor data and macroblock data adapted to be stored at respective memory addresses;

an address generator block for extracting respective memory addresses from said motion vector values;

a predictor fetch block for retrieving said predictor data based on respective memory addresses extracted by said address generator block;

a current macroblock fetch and distengine block for retrieving said macroblock data based on respective memory addresses extracted by said address generator block and for processing said macroblock data according to a given function; and a decision block for collecting retrieved macroblock data as partial results and selecting the best result therefrom; and wherein the circuit is formed on a monolithic integrated circuit substrate.

44. A method for processing an image data in digital form, comprising:

generating motion vector values including predictor data and macroblock data from input image data to be estimated, performing a coarse search on said image data to perform a first estimation step, and performing a fine search on the same image data to perform a second estimation step;

extracting respective addresses from said motion vector values;

retrieving said predictor data based on respective addresses extracted from the motion vector values;

retrieving said macroblock data based on respective addresses extracted from said motion vector values;

collecting said retrieved macroblock data as partial results and selecting from said partial results a preferred data set;

performing motion compensated noise level detection; and reducing the noise level based on the motion vectors resulting from the coarse search.

45. The method according to claim 44, further including:

outputting the addresses required to fetch said predictor data in sequential cycles.

46. The method according to claim 44, further including:

issuing as voids at least some of the addresses not requiring loading when the absolute coordinates of the predictor block are aligned.

47. A method for processing an image data in digital form, comprising:

generating motion vector values including predictor data and macroblock data from input image data to be estimated;

extracting respective addresses from said motion vector values;

retrieving said predictor data based on respective addresses extracted from the motion vector values;

retrieving said macroblock data based on respective addresses extracted from said motion vector values;

collecting said retrieved macroblock data as partial results and selecting from said partial results a preferred data set; and continuing to perform tag lookups to determine the next miss when the cache memory access stalls.

* * * * *

UNITED STATES PATENT AND TRADEMARK OFFICE

CERTIFICATE OF CORRECTION

PATENT NO. : 6,996,179 B2
DATED : February 7, 2006
INVENTOR(S) : Fabrizio Rovati et al.

It is certified that error appears in the above-identified patent and that said Letters Patent is hereby corrected as shown below:

Column 18,
Line 11, "of predictions;" should read -- of prediction; --.

Column 19,
Line 61, "memory is arranged" should read -- memory arranged --.

Signed and Sealed this

Second Day of May, 2006

JON W. DUDAS
*Director of the United States Patent and Trademark Office*